United States Patent

Hable et al.

[11] Patent Number: 6,060,032
[45] Date of Patent: May 9, 2000

[54] LAYERED ADSORBENT BED FOR CARBON MONOXIDE PRODUCTION

[75] Inventors: Christopher Thomas Hable, Breinigsville; Timothy Christopher Golden, Allentown; Wilbur Clymer Kratz, Macungie, all of Pa.

[73] Assignee: Air Products and Chemicals, Inc., Allentown, Pa.

[21] Appl. No.: 09/123,937

[22] Filed: Jul. 27, 1998

[51] Int. Cl.[7] .............................. C01B 31/18; B01J 8/00; B01J 20/00; B01D 53/00; B01D 53/02
[52] U.S. Cl. ..................... 423/210; 423/246; 423/247; 502/400; 502/416; 502/417; 585/820; 585/826; 585/829; 95/90
[58] Field of Search ............... 95/101, 90; 502/416, 502/417, 400; 585/829, 820, 826; 423/246, 247, 210

[56] References Cited

U.S. PATENT DOCUMENTS

| | | |
|---|---|---|
| 4,587,114 | 5/1986 | Hirai et al. ............................... 423/247 |
| 4,978,649 | 12/1990 | Surovikin et al. ....................... 502/416 |
| 5,126,310 | 6/1992 | Golden et al. ........................... 502/417 |
| 5,258,571 | 11/1993 | Golden et al. ........................... 585/829 |
| 5,531,809 | 7/1996 | Golden et al. ............................. 95/101 |

*Primary Examiner*—Gary P. Straub
*Assistant Examiner*—Eileen E. Nave
*Attorney, Agent, or Firm*—Geoffrey L. Chase

[57] ABSTRACT

A process is set forth for the production of a carbon monoxide stream from a feed stream comprising carbon monoxide, hydrogen, carbon dioxide, methane, nitrogen and moisture. The process comprises contacting the feed stream at elevated pressure with a layered adsorbent bed comprising (i) a pretreatment adsorbent in order to adsorb moisture preferentially over methane, nitrogen and carbon dioxide and (ii) a main adsorbent in order to adsorb carbon monoxide preferentially over hydrogen, carbon dioxide, methane and nitrogen. A key to the present invention is that a carbon-based adsorbent is used as the pretreatment adsorbent.

2 Claims, No Drawings

LAYERED ADSORBENT BED FOR CARBON MONOXIDE PRODUCTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a process for the production of a carbon monoxide stream from a feed stream comprising carbon monoxide, hydrogen, carbon dioxide, methane, nitrogen and moisture wherein said process comprises contacting the feed stream at elevated pressure with a layered adsorbent bed comprising:

(a) a pretreatment layer consisting of a pretreatment adsorbent in order to adsorb moisture preferentially over methane, nitrogen and carbon dioxide; and (b) a main layer consisting of a main adsorbent comprising a cuprous compound in order to adsorb carbon monoxide preferentially over hydrogen, carbon dioxide, methane and nitrogen;

The prior art teaches such a process. In particular, U.S. Pat. No. 5,531,809 by Golden et al. (the specification of which is hereby incorporated by reference) teaches such a process wherein the pretreatment adsorbent comprises a 3A molecular sieve zeolite.

The present invention is an improvement to Golden whereby an adsorbent comprising cuprous chloride on a carbon containing support is used as the pretreatment adsorbent instead of Golden's 3A molecular sieve zeolite. The use of cuprous chloride on a carbon containing support is an improvement to Golden because it satisfies all five of the following five desirable criteria for a pretreatment adsorbent. Contrast this with Golden's 3A molecular sieve zeolite which only satisfies the first two criteria.

(1) The ability to reversibly adsorb water. Otherwise, the main adsorbent comprising a cuprous compound will be adversely affected as follows. Firstly, water vapor is strongly adsorbed by inorganic-based adsorbents and thereby reduces the effective CO capacity of the adsorbent. Secondly, water vapor may oxidize the active CuCl (a preferred main adsorbent) to inactive Cu(OH)Cl. Finally, water may also solubilize chloride containing species on the adsorbent surface and cause corrosion problems.

(2) Limited or no adsorption of other bulk gas components comprising carbon dioxide, methane and nitrogen. Otherwise, these components will end up being in the carbon monoxide product since they will be subsequently desorbed along with the carbon monoxide during the product recovery sequence.

(3) Limited or no adsorption of the bulk gas component comprising hydrogen. Otherwise, hydrogen will end up being in the carbon monoxide product since it will be subsequently desorbed along with the carbon monoxide during the product recovery sequence. As noted above, Golden's 3A molecular sieve zeolite does not satisfy this criteria since hydrogen is small enough to be adsorbed by 3A molecular sieve zeolite.

(4) Acid resistance. Otherwise, contact between the main adsorbent layer and the pretreatment adsorbent layer will result in the migration of various species present on the main adsorbent layer (such as $CuCl_2$, $NH_4Cl$ and $HCl$) to the pretreatment adsorbent layer which in turn will result in dissolution of an acid unstable pretreatment adsorbent. This is particularly true if water breakthrough to the main adsorbent occurs. While carbon-based adsorbents are acid stable, most inorganic desiccants like Golden's zeolites are not. Thus, unlike the present invention, Golden requires an acid resistant sacrificial adsorbent between the pretreatment adsorbent layer and the main adsorbent layer.

(5) A capacity to adsorb carbon monoxide. Otherwise, the pretreatment adsorbent is essentially inactive for carbon monoxide production.

The utility of the present invention's pretreatment adsorbent is unexpected since carbon-based adsorbents are largely hydrophobic and thus would not typically be considered for a dehydration application. The present invention has surprisingly found however that cuprous chloride on a carbon containing support adsorbs enough moisture to prevent destruction of the main adsorbent while still providing all the other benefits discussed above.

The prior art does teach carbon-based adsorbents for separating carbon monoxide from mixed gases but only as stand alone adsorbents and not with the preferred surface area and bulk density characteristics of the present invention's carbon-based pretreatment adsorbent. In particular, U.S. Pat. No. 4,587,114 by Hirai teaches an adsorbent for separating carbon monoxide from mixed gases wherein the adsorbent is obtained by impregnation of an active carbon support with various copper salts. The adsorbent produced is claimed to be stable with respect to the water content in the feed gas owing to the hydrophobic nature of the carbon support and thus no special dehydrating pretreatment adsorbent is utilized. Because, however, Hirai's adsorbent contains significant microporosity owing to its high surface area of 1200 $m^2/g$, Hirai has high impurity levels of carbon dioxide and methane in the evacuated CO product. U.S. Pat. No. 5,126,310 by Kratz et al partially overcomes this problem with a lower surface area (600 $m^2/g$) carbon-based adsorbent. Kratz's adsorbent, however, has a low bulk density (24 $lbs/ft^3$), and thus lacks the required mechanical strength for operating in a pressure swing adsorption system.

BRIEF SUMMARY OF THE INVENTION

The present invention is a process for the production of a carbon monoxide stream from a feed stream comprising carbon monoxide, hydrogen, carbon dioxide, methane, nitrogen and moisture. The process comprises contacting the feed stream at elevated pressure with a layered adsorbent bed comprising (i) a pretreatment adsorbent in order to adsorb moisture preferentially over methane, nitrogen and carbon dioxide and (ii) a main adsorbent in order to adsorb carbon monoxide preferentially over hydrogen, carbon dioxide, methane and nitrogen. A key to the present invention is that a carbon-based adsorbent is used as the pretreatment adsorbent.

DETAILED DESCRIPTION OF THE INVENTION

The present invention is a process for the production of a carbon monoxide stream from a feed stream comprising carbon monoxide, hydrogen, carbon dioxide, methane, nitrogen and moisture wherein said process comprises contacting the feed stream at elevated pressure with a layered adsorbent bed comprising:

(a) a pretreatment layer consisting of a pretreatment adsorbent comprising cuprous chloride on a carbon containing support in order to adsorb moisture preferentially over methane, nitrogen and carbon dioxide; and (b) a main layer consisting of a main adsorbent comprising a cuprous compound (typically cuprous chloride on an aluminum containing support) in order to adsorb carbon monoxide preferentially over hydrogen, carbon dioxide, methane and nitrogen.

Preferably, the carbon-based pretreatment adsorbent has only moderately small pores (as opposed to micropores) providing a surface area less than 500 m$^2$/g. The moderately sized pores reduce the co-adsorption of carbon dioxide and methane vis-a-vis microporous adsorbents, thereby reducing the levels of these components in the evacuated carbon monoxide product.

Also preferably, the carbon-based pretreatment adsorbent has a bulk density greater than 30 lbs/ft$^3$. This ensures the required mechanical strength for operating in a pressure swing adsorption (PSA) system or vacuum swing adsorption (VSA), which is a subset of PSA wherein the depressurization/product recovery step is performed down to vacuum pressure levels.

Experiments were carried out in a VSA pilot development unit to test the performance of the present invention's layered adsorbent bed. The unit consists of four beds, 12 feet long and 2 inches in diameter. Two of the beds were filled with adsorbent(s) for VSA production of CO, while the two other beds contained 5A zeolite for H$_2$ purification. Only the VSA cycle for the two beds used for CO recovery Will be described. The steps include (1) pressurization with pure H$_2$ countercurrent to the direction of feed to a superambient pressure (245 psig), (2) feed with a gas mixture containing 67% H$_2$, 21% CO, 5% CH$_4$, 6% CO$_2$ and 1% N$_2$ at 245 psig, (3) cocurrent depressurization of the column to 5 psig. (This depressurization effluent is recycled to the feed end of the bed to insure high CO recovery), (4) cocurrent purge with product CO at 5 psig and (5) evacuation of pure CO product at a vacuum level of 80 torr. Then the cyclic process is continued from steps 1 through 5. The important process parameters include the total evacuated CO, and the product impurity levels of CO$_2$, CH$_4$ and H$_2$.

In the first experiment, 12 feet of CuCl on alumina was used exclusively as the adsorbent. In the second experiment, a layered bed as per Golden comprising 9 inches of UOP 3A, and 11.25 feet of CuCl on alumina was employed. In the third experiment, a layered bed as per the present invention comprising 18 inches of CuCl on carbon and 10.5 feet of CuCl on alumina was employed. The CuCl on alumina was produced as per Example 1 in Kratz. The CuCl on carbon material was produced as follows. 303.7 g of CuCl$_2$ and 43.5 g of dibasic ammonium citrate were dissolved in water to a final volume of 500 ml. This solution was then poured over 541.8 g of Sibunit P-1-000 carbon which had been pretreated in air at 140° C. for 16 hours. This carbon was obtained from the Boreskov Institute of Catalysis in Novosibirsk, Russia and was produced as per U.S. Pat. No. 4,978,649. After impregnation and air drying at ambient temperature, the adsorbent was activated in synthesis gas (25% CO/75% H$_2$) at 150° C. for 16 hours.

The results of pilot development unit are given in Table 1. The results show that using the C/CuCl pretreatment layer gives a higher CO evacuation quantity and improved CO purity values than the 3A pretreatment layer. In fact, the performance with C/CuCl pretreatment is almost equal to that of CuCl/alumina with dry feed gas. In particular, the C/CuCl pretreatment shows significantly reduced H$_2$ levels compared with 3A. 3A shows high H$_2$ impurity levels because only H$_2$ of all the feed gas components, except water, is small enough to enter the pore structure of 3A and thereby end up in the evacuated CO product. The C/CuCl adsorbent has high selectivity for CO and water over H$_2$ which minimizes co-adsorbed H$_2$. The results of Table 1 show the unexpected result that a carbon-based dehydration layer improves the performance of CO VSA over standard inorganic desiccants.

TABLE 1

| Adsorbent(s) | Wet or Dry feed | (mmole/cycle) CO Evac | (ppm) CH$_4$ impurity | (ppm) H$_2$ impurity | (%) CO$_2$ impurity |
|---|---|---|---|---|---|
| CuCl/alumina | Dry | 5.6 | 60 | 280 | 0.7 |
| 3A and CuCl/alumina | Wet | 5.1 | 100 | 2000 | 0.8 |
| CuCl/carbon and CuCl/alumina | Wet | 5.3 | 70 | 250 | 0.5 |

Given the water-resistant aspect of carbon-based CO adsorbents, the performance of carbon-based materials as stand-alone adsorbents is of interest. To this end, Kratz's and Harai's carbon-based adsorbents were tested in the VSA pilot development unit described above and the performance was compared with Table 1's CuCl an alumina adsorbent. Using a feed gas composition of 75% H$_2$, 22% CO, 2% CH$_4$ and 1% N$_2$ and a feed pressure of 200 psig produced the results given in Table 2. All these results were obtained with dry feed gas.

TABLE 2

| Adsorbent | (mmole/cycle) CO Evacuated | (mmole/cycle) CO Product | (ppm) CH$_4$ Impurity |
|---|---|---|---|
| CuCl/alumina | 5.9 | 4.7 | 40 |
| CuCl/carbon (Kratz) | 5.3 | 3.0 | 300 |
| CuCl/carbon (Harai) | 5.8 | 4.2 | 460 |

The results in Table 2 clearly show that the alumina-based adsorbent yields 1) higher CO evacuated, 2) higher CO productivity (Evacuation—Purge) and 3) higher purity CO. and thus are preferred for this application. This means that the performance of a mixed bed of CuCl/carbon and CuCl/alumina will even more significantly outperform a stand-alone CuCl/carbon bed. Note also the very high CH$_4$ impurity level for Harai's adsorbent which is due to the significant microporosity of Harai's adsorbent as discussed previously. Finally, it should be noted that Kratz's adsorbent experienced excessive dusting during VSA operation. After 15 cycles, significant particle break-up was noted, plugging particle filters, increasing purge pressure drop and eventually causing shut-down of the unit.

We claim:

1. In a process for the removal of a carbon monoxide stream from a feed stream comprising carbon monoxide, hydrogen, carbon dioxide, methane, nitrogen and moisture wherein said process comprises contacting the feed stream at elevated pressure with a layered adsorbent bed comprising:

(a) a pretreatment layer consisting of a pretreatment adsorbent in order to adsorb moisture preferentially over methane, nitrogen and carbon dioxide; and (b) a main layer consisting of a main adsorbent comprising a cuprous compound in order to adsorb carbon monoxide preferentially over hydrogen, carbon dioxide, methane and nitrogen;

the improvement to the above process comprising using an adsorbent comprising cuprous chloride on a carbon containing support as said pretreatment adsorbent wherein the pretreatment adsorbent provides a surface area between 50 $m^2/g$ to 500 $m^2/g$ and wherein the pretreatment adsorbent has a bulk density greater than 30 $lbs/ft^3$.

2. The process of claim 1 wherein the main adsorbent comprises cuprous chloride on an aluminum containing support.

* * * * *